(12) United States Patent
Prsha et al.

(10) Patent No.: US 7,288,929 B2
(45) Date of Patent: Oct. 30, 2007

(54) INDUCTIVE CLAMP FOR APPLYING SIGNAL TO BURIED UTILITIES

(75) Inventors: Jeffrey A. Prsha, San Diego, CA (US); Lisa E. Latimer, San Diego, CA (US); Mark S. Olsson, La Jolla, CA (US); James F. Kleyn, Santee, CA (US); Jan Soukup, San Diego, CA (US)

(73) Assignee: Seektech, Inc., San Diego, CA (US)

( * ) Notice: Subject to any disclaimer, the term of this patent is extended or adjusted under 35 U.S.C. 154(b) by 70 days.

(21) Appl. No.: 11/184,658

(22) Filed: Jul. 19, 2005

(65) Prior Publication Data

US 2007/0017301 A1    Jan. 25, 2007

(51) Int. Cl.
*G01N 3/02*   (2006.01)
*G01R 15/18*  (2006.01)

(52) U.S. Cl. ..................................... 324/127
(58) Field of Classification Search .................. 73/860, 73/856; 336/107; 324/66, 67, 127
See application file for complete search history.

(56) References Cited

U.S. PATENT DOCUMENTS

| | | | |
|---|---|---|---|
| 3,199,026 A | | 8/1965 | Leibowitz |
| 3,611,136 A * | 10/1971 | Ito et al. ..................... 324/127 |
| 3,706,032 A | 12/1972 | Vikstrom | |
| 4,005,380 A * | 1/1977 | Heilmann et al. ........ 336/84 R |
| 4,234,863 A * | 11/1980 | Shumway et al. ............ 336/90 |
| 4,312,363 A * | 1/1982 | Rothfuss et al. ............ 600/587 |
| 4,378,525 A * | 3/1983 | Burdick ...................... 324/127 |
| 4,517,833 A | 5/1985 | Wesley ....................... 73/119 |
| 4,795,979 A | 1/1989 | Kreft et al. ................. 324/379 |
| 4,914,399 A * | 4/1990 | Doany ......................... 330/10 |
| 5,039,970 A * | 8/1991 | Cox ........................... 336/107 |
| 5,567,870 A * | 10/1996 | Harris ........................... 73/81 |
| 5,757,190 A | 5/1998 | Mercer ....................... 324/326 |
| 5,767,416 A * | 6/1998 | Conard ....................... 73/856 |
| 6,211,807 B1 | 4/2001 | Wilkison ..................... 342/22 |
| 6,396,278 B1 * | 5/2002 | Makhija ..................... 324/402 |
| 6,541,955 B2 * | 4/2003 | Landre ....................... 324/127 |
| 6,885,567 B2 | 4/2005 | Lincoln et al. .......... 363/56.01 |
| 7,026,811 B2 * | 4/2006 | Roney et al. ............... 324/242 |

* cited by examiner

*Primary Examiner*—Michael Cygan
*Assistant Examiner*—Octavia Davis
(74) *Attorney, Agent, or Firm*—Michael H. Jester

(57) ABSTRACT

An inductive clamp includes a pair of jaws configured to surround a conductor, and a pair of handles, each connected to a corresponding jaw. A pivotal connection is provided that allows the jaws to close around a conductor. The jaws are optionally biased to hold them closed around the conductor. A ferromagnetic core is mounted in each jaw and a coil surrounds at least one of the cores. An indicator is provided that tells a user that a signal has been applied to at least one of the cores.

18 Claims, 9 Drawing Sheets

INDUCTIVE CLAMP FOR APPLYING SIGNAL TO BURIED UTILITIES

FIELD OF THE INVENTION

The present invention relates to electronic systems and method for locating buried or otherwise inaccessible pipes, cables and conductors by detecting an electromagnetic signal emitted by these buried objects.

BACKGROUND

During construction that involves excavation, it is prudent to determine the actual location of buried pipes, cables, gas lines, AC electric lines, sprinkler wires, CATV cable, communications wiring, and so forth. This is usually done with a portable hand-held locator that senses electromagnetic signals emitted by such buried objects. This is because maps of such buried objects, if they are available at all, are often not complete and/or accurate. Where buried utilities carry an electric signal, such as power lines, often no additional signal need be applied to perform the location. But many pipes and other conduits have no electromagnetic emission that is readily detectable. While a metal water pipe or gas pipe may, for example, re-radiate surrounding electromagnetic signals, the re-radiated signals are weak, and spread over many different frequencies. This makes the location of such buried utilities with a conventional hand-held locator very difficult. The solution is to apply an external signal from an electronic transmitter usually tuned to a specific frequency optimized for the particular application. However, many buried utilities and other objects are shielded with insulation or other dielectric coating. Therefore, inductive clamps are used to induce a signal at a predetermined desired frequency without making any direct electrical connection to the metal conductor in the buried utility or other buried object.

SUMMARY OF THE INVENTION

In accordance with one aspect of the invention, an inductive clamp includes a pair of jaws configured to surround a conductor, and a pair of handles, each connected to a corresponding jaw. A pivotal connection is provided that allows the jaws to close around the conductor. The jaws are optionally biased to hold them closed around the conductor. A ferromagnetic core is mounted in each jaw and a coil surrounds at least one of the cores. An indicator is provided that tells a user that a signal has been applied to at least one of the cores.

In accordance with another aspect of the invention, an inductive clamp includes a pair of jaws configured to surround a conductor, a ferromagnetic core mounted in each jaw, and a pair of handles, each connected to a corresponding jaw. A floating pivotal connection is provided that allows the jaws to close around the conductor and ensures that a pair of flat opposing ends of the cores are mated. The jaws are biased by at least one leaf spring to hold them closed around the conductor. A coil surrounds at least one of the of the cores.

In accordance with still another aspect of the invention, an inductive clamp includes a pair of jaws configured to surround a conductor, and a pair of handles, each connected to a corresponding jaw. A pivotal connection is provided that allows the jaws to close around the conductor. The jaws are optionally biased to hold them closed around the conductor. A ferromagnetic core is mounted in each jaw and a coil surrounds one of the cores. A cable spool is dimensioned and configured to be releasably held between jaws for having an electric cord wrapped around the cable spool.

DETAILED DESCRIPTION

Inductive clamps that have been commercially available have not had an optimum construction that maximizes the induced signal. A rugged, simple, low profile pivot mechanism is needed to ensure that there is a minimal gap between the opposing ends of the ferromagnetic cores. Even a small gap at either end can dramatically affect the ability of the clamp to induce a single into the conductor it is clamped around. A pivot mechanism that allows the enclosures around each ferromagnetic core to be as narrow in thickness as possible will allow the clamp to be used in locations where there is a narrow space between a conduit and its supporting pole or wall. On the other hand, the performance of the clamp improves when the size of the cores is made as large as possible.

Transmitters that energize and apply signals to inductive clamps typically have three modes: 1) a direct connection mode; 2) an induction mode; and 3) a clamp mode. It is easy for the user to put the transmitting device into the wrong mode or forget to plug the clamp securely into its corresponding socket. The user does not have any immediate feedback regarding the wrong mode selection or lack of clamp connection.

The clamp is often placed over a cable or conduit where the closure point of the clamp is hidden behind the cable on the side away from the operator. If the clamp fails to close completely for any reason, the clamp may fail to induce a measurable signal into target utility. The user has no indication when the clamp is properly installed and fully closed.

An inductive clamp in accordance with an embodiment of the invention is designed for use with a portable hand-held locator and portable electronic transmitter of the type disclosed in co-pending U.S. patent application Ser. No. 11/077,947 filed Mar. 11, 2005 of Mark S. Olsson et al., the parent of which was previously published Apr. 15, 2004 under Publication No. US-2004-0070535-A1. The entire contents of said co-pending application and said published parent application are hereby incorporated by reference.

Figure 1:
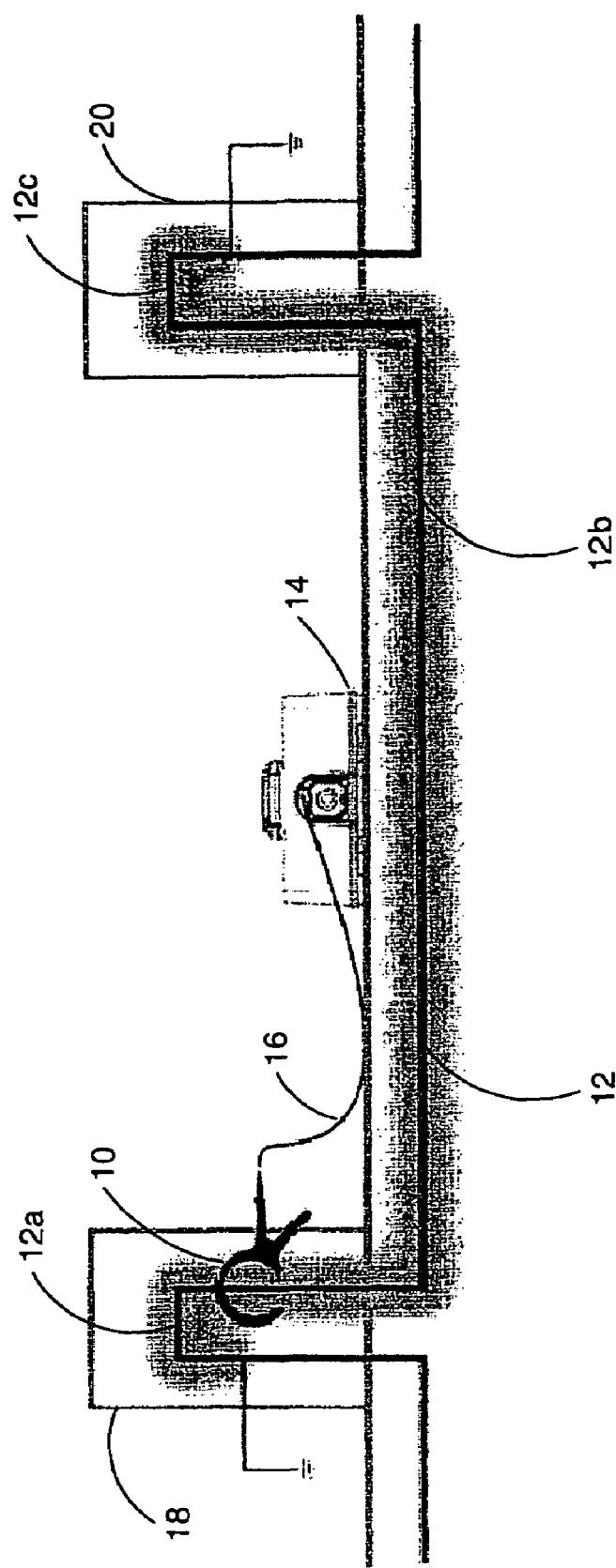
FIG. 1 is a diagrammatic illustration of a typical usage of an inductive clamp in accordance with the invention.

Referring to FIG. 1, inductive clamp 10 in accordance with an embodiment of the invention allows a user to apply a signal to an insulated cable 12 when connecting directly to the target conductor is not practical. Clamp 10 wraps around an accessible above-ground segment 12a of cable 12. A portable electronic transmitter or line illuminator 14 supplies an oscillating signal to clamp 10 via electrical cord 16. Transmitter 14 is pre-set to the desired frequency, preferably between about 100 Hz and 500 kHz. Clamp 10 inductively couples to the target conductor inside the insulating jacket of cable 12. A portion of the cable 12 then radiates electromagnetic energy at the frequency of the applied signal.

The location of buried segment 12b of the energized cable 12 can be determined by a user walking back and forth over the ground above and near cable 12 carrying a hand-held portable locator (not illustrated). This location is generally marked by spray painting a line on the ground, concrete walk and/or pavement. The color of the paint indicates whether the buried object is a water line, gas line, etc. according to a well-known convention. Above-ground segments 12a and 12c of cable 12 are illustrated as being contained within utility boxes 18 and 20, respectively, at least one of which can be opened to gain access to above-ground segment 12a or 12c. The pivotable jaws of clamp 10, hereafter described in detail, must be completely closed around cable 12 in order to effectively apply the signal. The jaws of clamp 10 are illustrated in the open position in FIG. 7 to demonstrate how clamp 10 is installed around cable segment 12a. For optimal signal strength, clamp 10 should be placed around cable 12 between two grounded points, otherwise the radiated electromagnetic signal may not be strong enough to locate. When applying the signal between the ground points the signal will only radiate from the portion of cable 12 between the ground points.

The most common example of buried utilities that can be traced in this manner are telephone cable, power cable, CATV cable and pipe. The pipe may be plastic and may function as a conduit for wiring, or it may be coated or wrapped metal pipe. Where the pipe is hollow and made of plastic, it may be filled with a electrolyte solution in which the signal may be induced.

Figure 2:
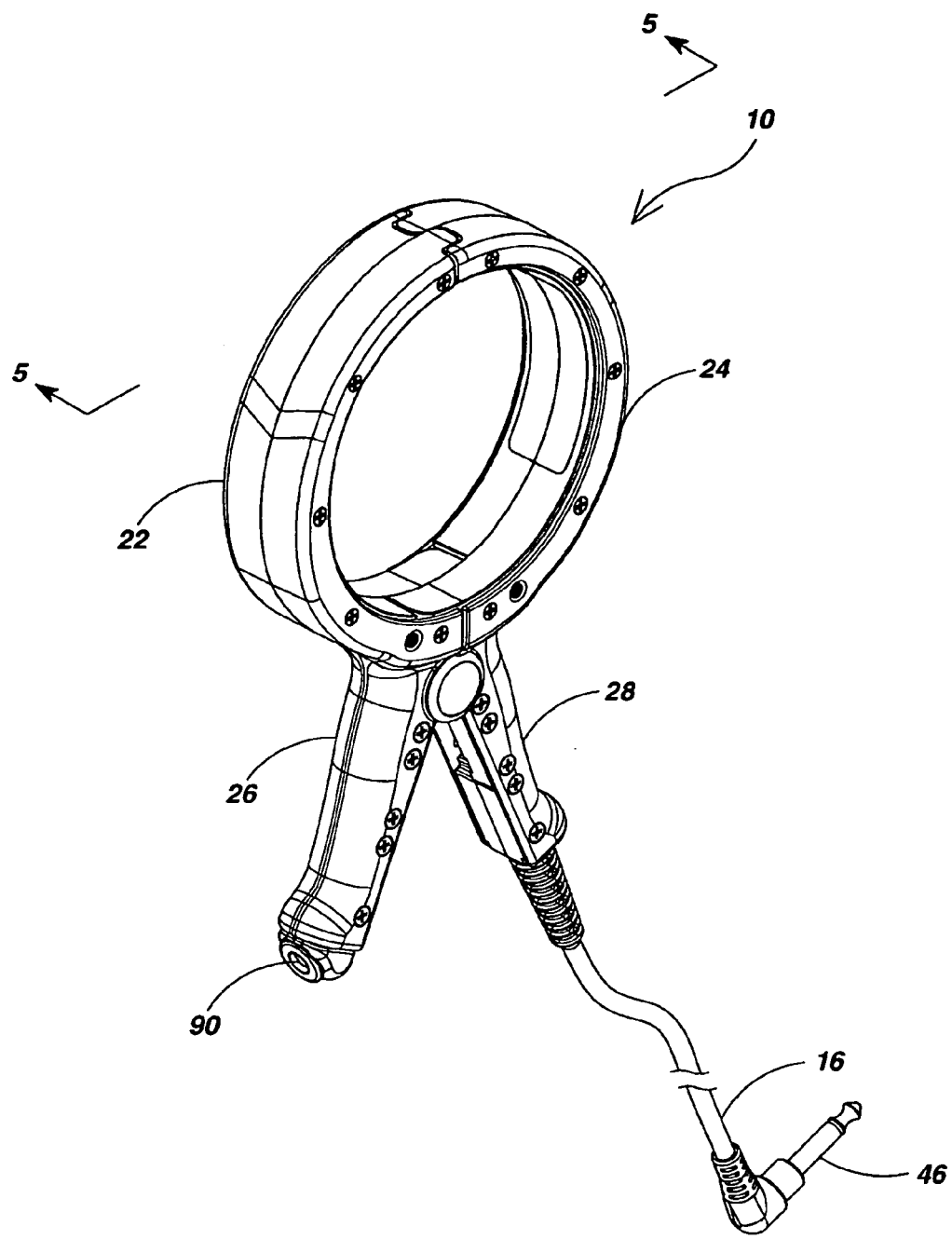
FIG. 2 is a perspective view of an embodiment of an inductive clamp in accordance with the invention.

Referring to FIG. 2, inductive clamp 10 has a pair of C-shaped jaws 22 and 24, each connected to corresponding handles 26 and 28 which may be gripped to open the jaws by overcoming the force of a leaf spring assembly 30 (FIG. 4) hereafter described in detail. Each jaw and handle combination, such as jaw 22 and handle 26, may be made of integrally molded plastic halves held together by screws 32. Each jaw such as 22 holds a semi-circular core 34 (FIGS. 4 and 5) made of laminated layers of a ferromagnetic material, such as that sold under the trademark SuperPerm 80™, the layers being separated by suitable insulation material in order to reduce eddy currents. The insulating material can be separate layers interspersed between the ferromagnetic layers or the ferromagnetic layers can be coated with a suitable plastic material.

Figure 6:
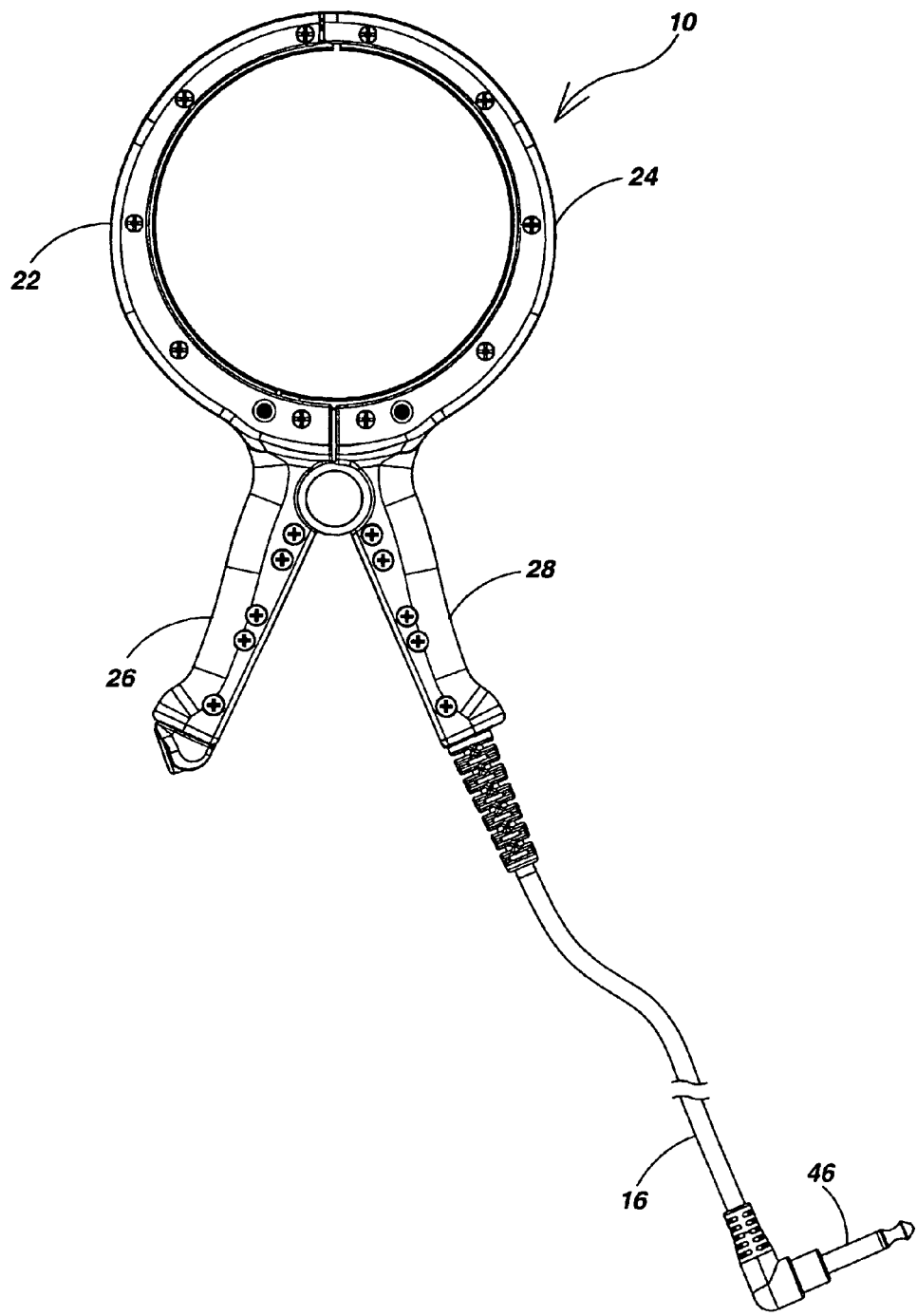
FIGS. 6 and 7 are elevation views illustrating the floating pivot point provided by the leaf spring assembly in the handles of the inductive clamp of FIG. 2.
Figure 7:
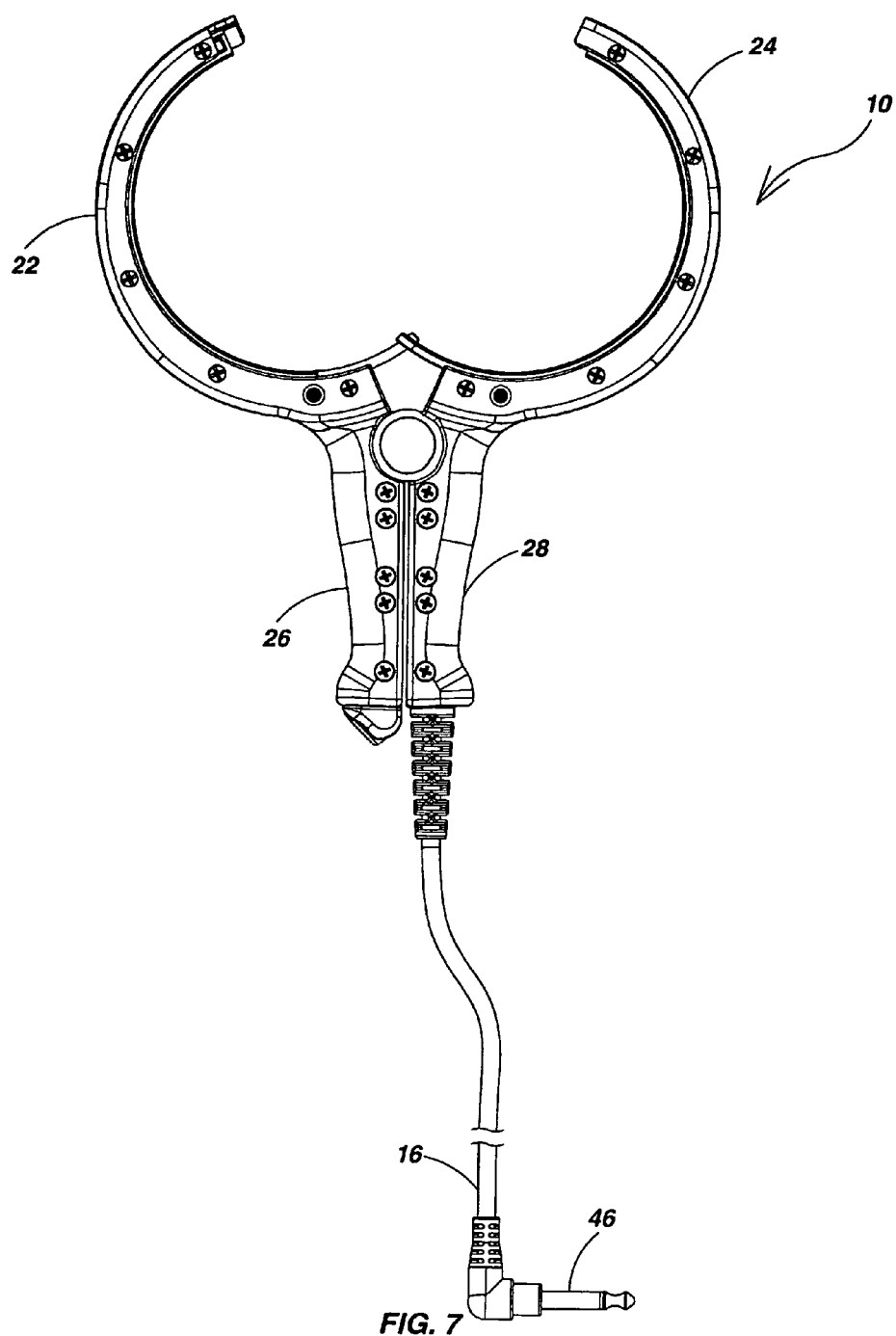

It is important that the opposing flat ends of the cores 34 butt up against each other when the jaws 22 and 24 are closed in order to ensure that the maximum amount of signal can be induced into the cable, pipe or other conductor about which inductive clamp 10 has been positioned. A gap of one thousandth of an inch, for example, can lead to a fifty percent reduction in the strength of the induced signal. Accordingly, leaf spring assembly 30 provides a floating pivot point that moves generally along the clamp center line plane as the jaws 22 and 24 open and close. The fully closed and fully open positions of the jaws 22 and 24 are illustrated in FIGS. 6 and 7, respectively. The clamp center line plane is the plane that extends between the flat abutting surfaces of the handles 26 and 28 in FIG. 7. This structural arrangement optimizes the closure geometry of the jaws 22 and 24 such that the flat opposing faces at each end of each core 34 will come into substantially full contact with one another.

Figure 8:
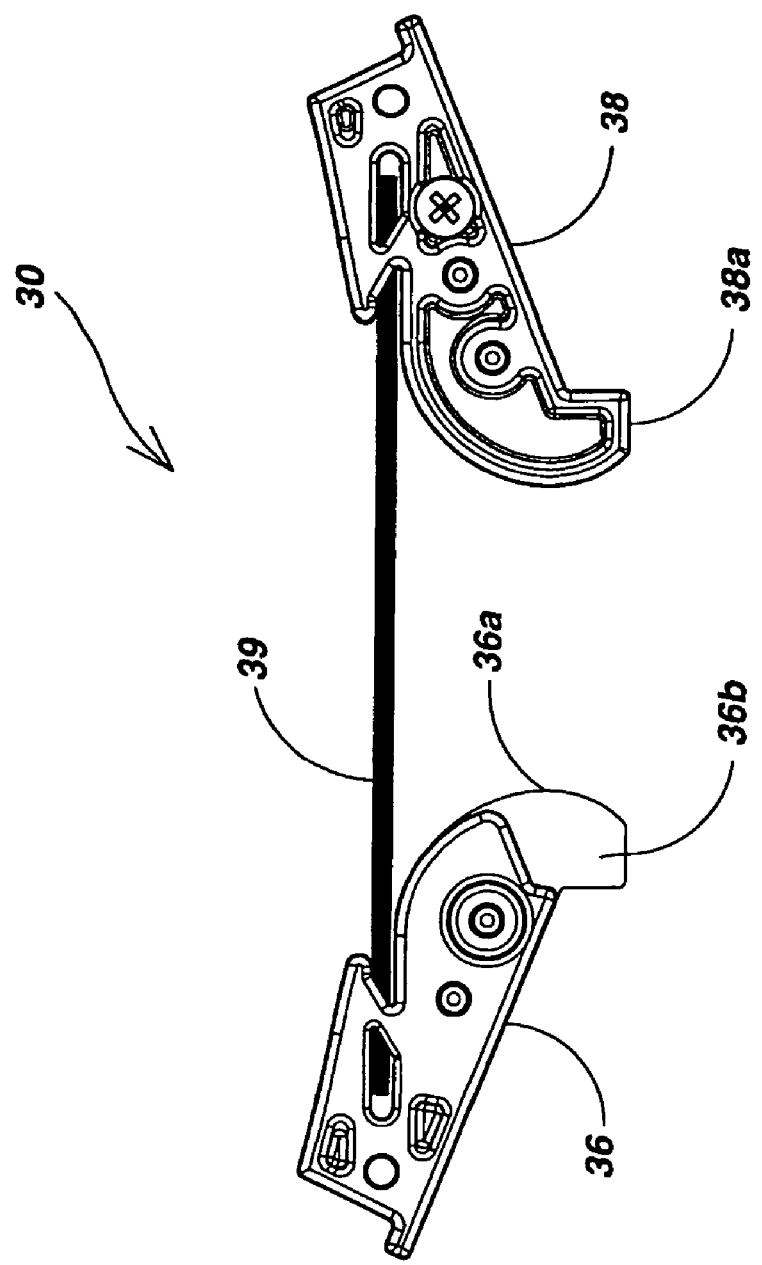
FIG. 8 is an enlarged elevation view of the spring mounts and leaf springs of the leaf spring assembly of the inductive clamp of FIG. 2 prior to bending of the same.

Referring to FIG. 8, leaf spring assembly 30 comprises a pair of complementary injection molded plastic spring mounts 36 and 38 that retain the ends of a stack 39 of individual steel leaf springs. During assembly, the inner ends of spring mounts 36 and 38 mate. A hook-shaped projection 38a on spring mount 38 fits into a recess 36b formed in spring mount 36. A hook-shaped projection 36a on spring mount 36 fits into a recess (not visible) in spring mount 38. The flat ends of the hook-shaped projections 36a and 38a engage opposing flat surfaces of the recesses such as 36b. As best seen in FIG. 2, the outer ends of the spring mounts 36 and 38 are retained inside handles 26 and 28. When the handles 26 and 28 are squeezed in the user's hand to open the jaws 22 and 24, the outer ends of the individual leaf springs 30 slide longitudinally over one another.

The cores 34 (FIG. 5) are surrounded by elastomeric members (not illustrated) to allow minute radial movement to ensure positive mating of the opposing ends of the cores 34. These elastomeric members are preferably made of double-stick foam material.

Figure 3:
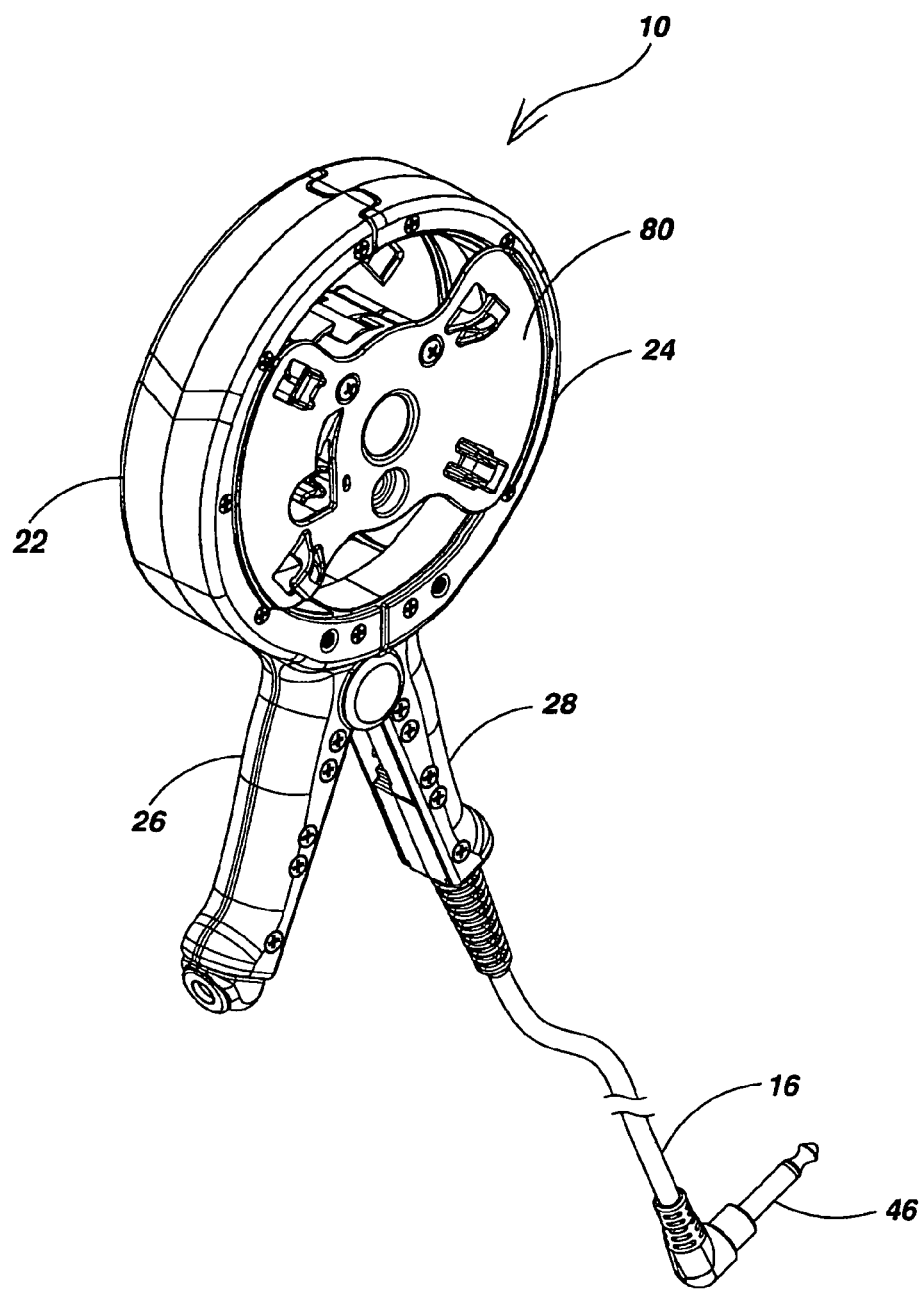
FIG. 3 is a view similar to FIG. 2 showing a cable spool clamped between the jaws of the inductive clamp.
Figure 4:
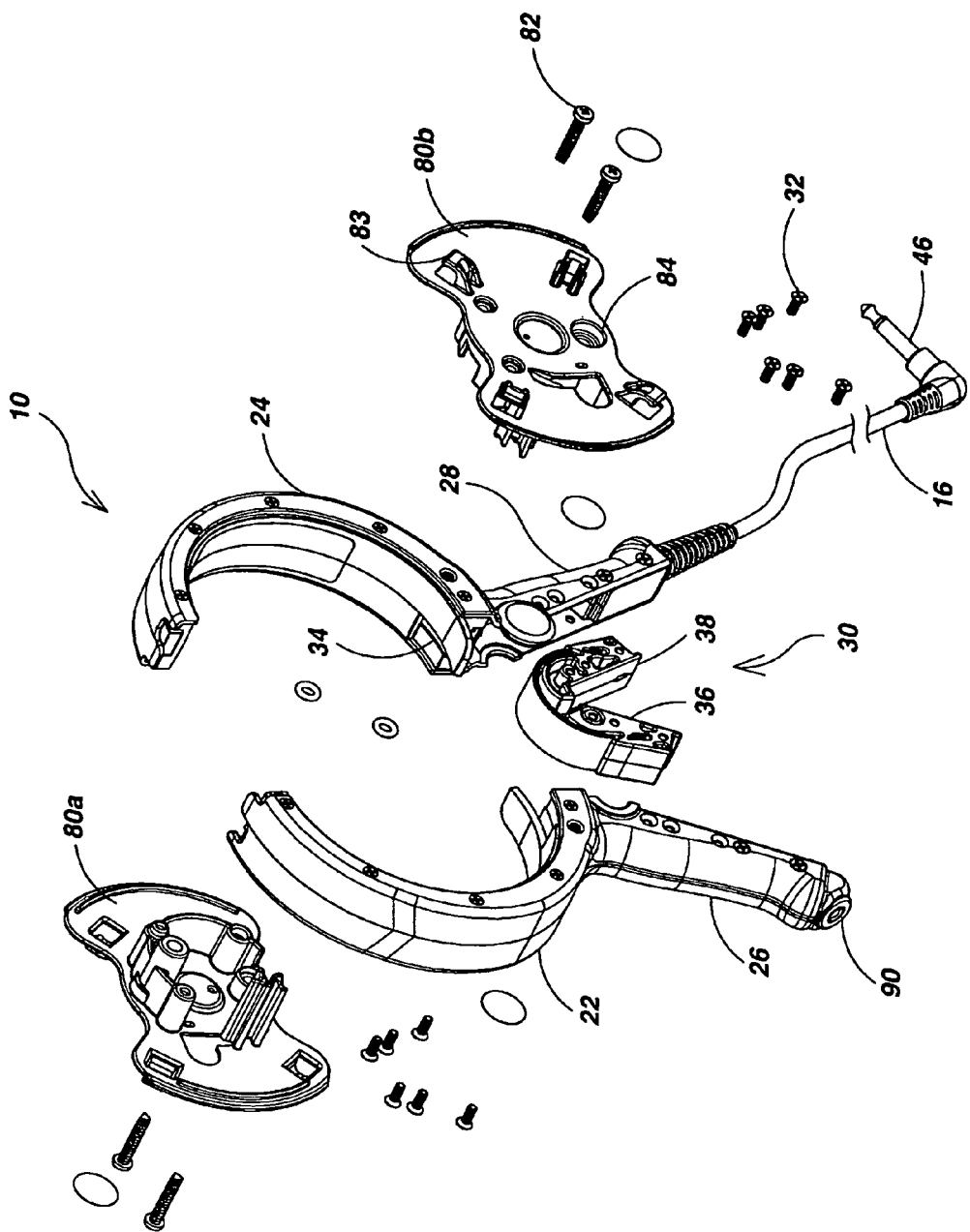
FIG. 4 is an exploded view of the inductive clamp of FIG. 3.
Figure 5:
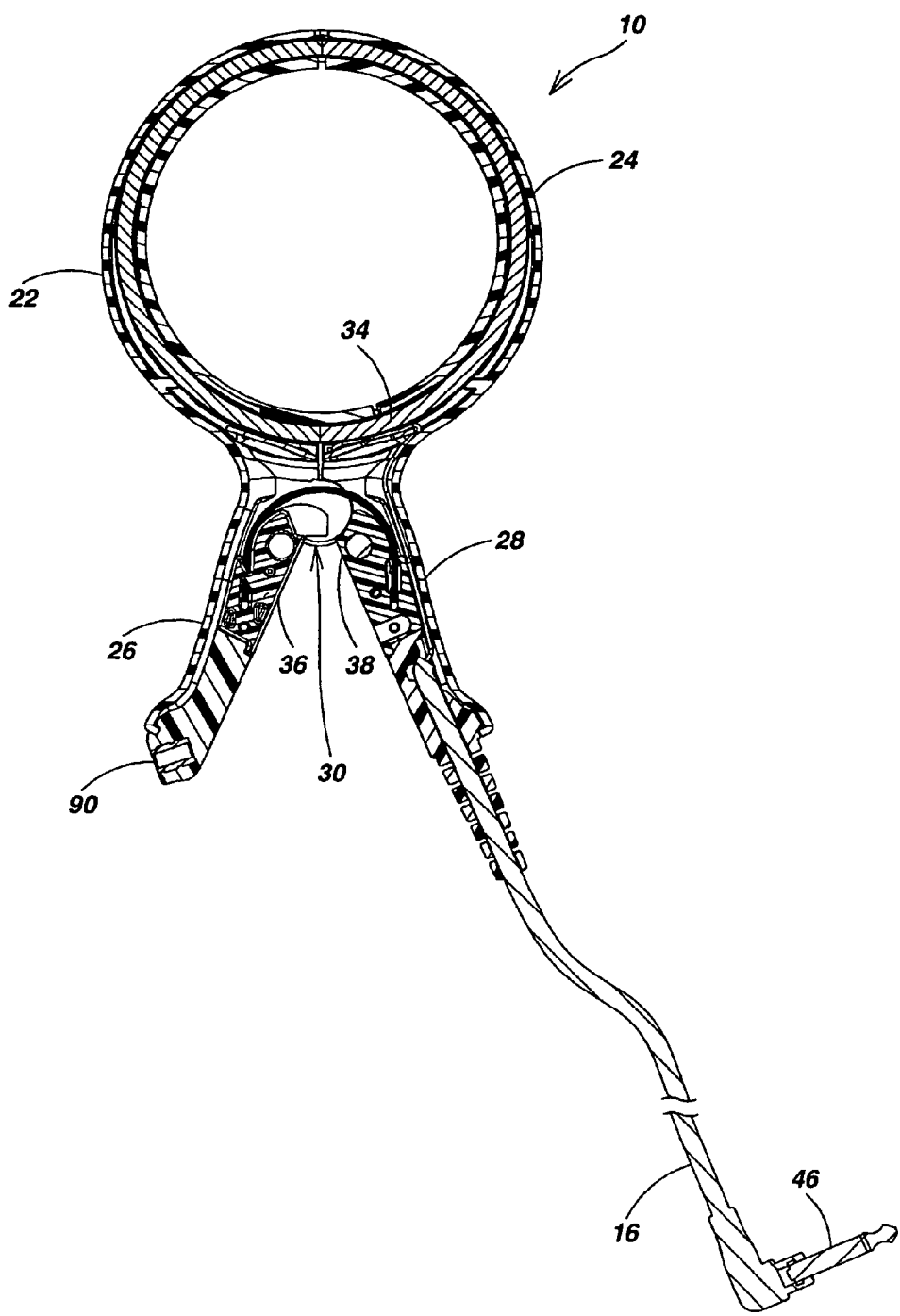
FIG. 5 is a sectional view of the inductive clamp of FIG. 2 taken along line 5-5 of FIG. 2 showing the mounting of its core.

Referring to FIGS. 3 and 4, cord 16 may be wrapped around a cable spool 80 made from injection molded plastic spool halves 80a and 80b (FIG. 4) held together by screws 82. The cable spool 80 is dimensioned and configured to be releasably held between jaws 22 and 24 for convenient stowage and transport of cord 16 along with inductive clamp 10. To this end, the outer edges of spool halves 80a and 80b are stepped and overlap the outer peripheries of jaws 22 and 24 when they are fully closed about cable spool 80. The spool halves 80a and 80b are molded with resilient deflectable raised ears 83 for pinching cord 16 and holding the same in place. Dummy socket 84 is molded into the spool half 80b for having phono plug 46 inserted into the same for stowage. The cable spool 80 can be readily removed from the inductive clamp 10 and the cord 16 payed out therefrom for connection to transmitter 14.

An internally threaded metal socket 90 (FIG. 2) is provided in handle 26 and extends at an angle of between about sixty degrees and ninety degrees from the clamp center line plane when the handles 26 and 28 are fully closed. In the illustrated embodiment of the clamp 10 the angle of the central axis of the threaded metal socket 90 with respect to the clamp center line plane is seventy and one-half degrees when the handles 26 and 28 are fully open as illustrated in FIG. 6 and it is forty seven degrees when the handles 26 and 28 are fully closed as illustrated in FIG. 7. The distal end of a so-called "hot stick" can be screwed into socket 90 and the user can then pull down on the proximal end of cord 16 to open jaws 22 and 24 and allow them to be remotely clamped around a cable or pipe when they cannot be otherwise reached. The angle of socket 90 is selected to provide sufficient mechanical advantage or leverage to facilitate opening of the jaws 22 and 24 in this fashion. The hot stick enables the user to reach into difficult locations such as a cable vault and install the clamp 10. Use of the hot stick to install the clamp 10 where high voltage is present is discouraged for safety reasons.

Figure 9:
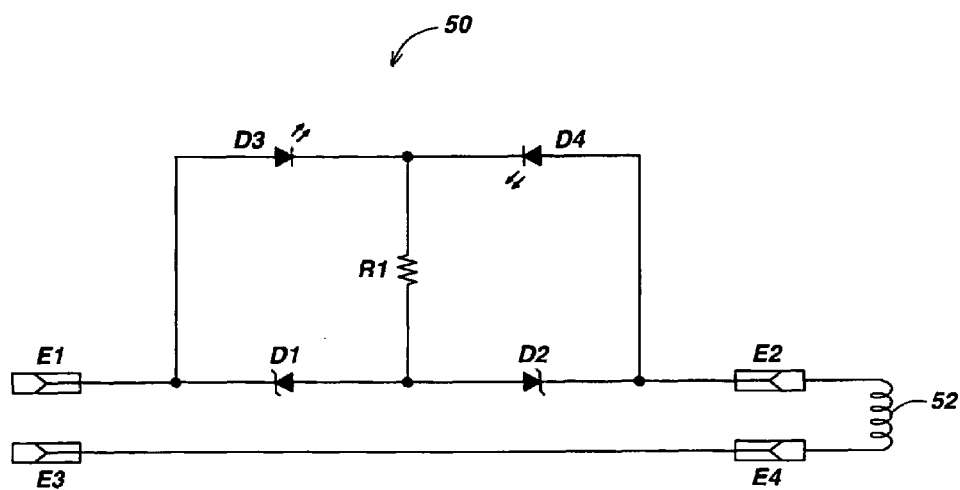
FIG. 9 is a schematic diagram of a circuit that energizes the cores of the inductive clamp of FIG. 2 and indicates a power ON condition to a user.

An energizing circuit 50 illustrated in FIG. 9 is used in series with an excitation (drive) winding 52 that is wound around one of the ferromagnetic cores 34. The energizing circuit 50 allows green LEDs (D3 and D4) to be illuminated at essentially constant brightness regardless of drive level by an AC source. It is easy for the user to put the transmitting device into the wrong mode or forget to plug the clamp securely into its corresponding socket. The energizing circuit 50 gives the user immediate feedback regarding the wrong mode selection or lack of clamp connection. The driving AC source is connected across E1 & E3 and the inductive clamp excitation winding 52 is connected across E2 & E4. The inductive clamp 10 is typically driven at currents much higher than the LEDs are rated for and at varying voltages depending on loading. As a result the circuit of FIG., 9 provides a regulator circuit that drives a fixed current through the LEDs D3 and D4 and bypasses the remaining drive current around the LEDs D3 and D4. When a current greater than 20 mA is applied between E1 and E3 (as occurs in the positive half cycle of the AC drive waveform), zener diode D1 avalanches under reverse bias and provides a fixed 3.9V potential across D3 and R1. This 3.9V is sufficient to turn on LED D3 in the forward direction and resistor R1 limits the current through D3 to approximately 20 mA. Diode D2 conducts in the forward direction with approximately 0.7V across its junction to complete the circuit between E1 & E2. The combined voltage drop across R1 and D2 is insufficient to avalanche LED D4 resulting in no significant current flowing in D4. On the negative, half cycle of the AC, drive waveform, the current flow reverses and D2 reverse avalanches, biasing D4 on, while D1 turns on preventing D3 from avalanching. As a result, the LEDs D3 and D4 are only on for a 50% duty cycle and operate within their design limits. Thus the user is provided with an indication that a signal has been applied to at least one of the ferromagnetic cores 34, regardless of whether or not any signal is actually induced in one of the cores 34.

Figure 10:
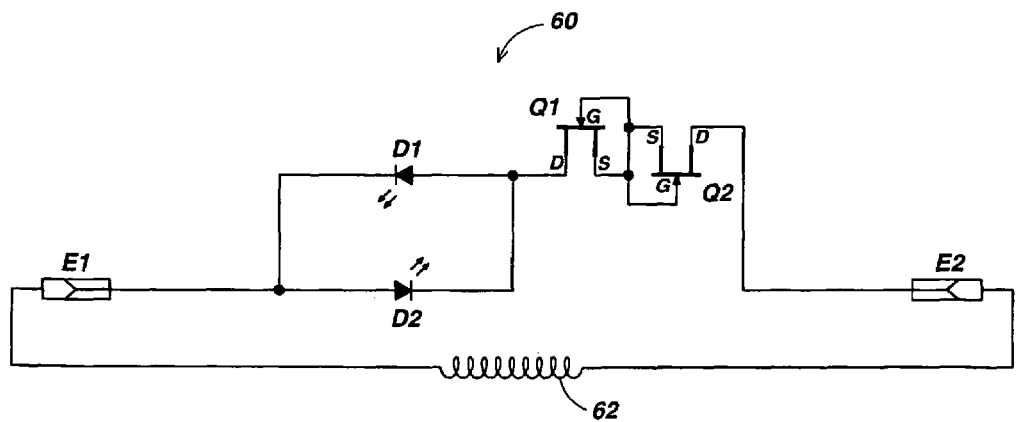
FIG. 10 is a schematic diagram of a circuit that senses the signal induced in the cores by the circuit of FIG. 9 and indicates to the user that the jaws of the inductive clamp are fully closed.

A sensing circuit 60 illustrated in FIG. 10 is driven by the sense winding 62 of the inductive clamp 10. If the clamp fails to close completely for any reason, the clamp may fail to induce a measurable signal into target utility. The sensing circuit 60 provides the user with an indication that the clamp 10 is properly installed and fully closed. The sense winding 62 is wound around the other ferromagnetic core 34 and is connected between E1 and E2. The sensing circuit 60 only allows a fixed maximum current to flow through the LEDs (D1, D2) regardless of the voltage between E1 and E2 (up to the breakdown voltage of junction field effect transistors (JFETs) Q1 and Q2). On the positive half of the AC waveform supplied by the sense winding 62 of the inductive clamp 10, LED D1 is reverse biased and turns off while LED D2 is forward biased and turns on transistors Q1 and Q2 form a constant current source of approximately 10 mA. Since these devices are operated at zero gate-source bias voltage, they quickly reach their current saturation limits and prevent a current greater than ~10 mA from flowing. This allows the LEDs D1 and D2 to illuminate when time varying magnetic flux from the excitation winding reaches the sense winding 62 (the gap between the cores 34 is closed and the magnetic flux path is completed) but prevents excessive currents from flowing in the sense winding 62 which would parasitically reduce the flux available to drive the intended load and drive the LEDs D1 and D2 at currents higher than their design limits. On the negative half cycle, the current reverses, D2 turns off and D1 turns on.

Excitation winding 52 (FIG. 9) is wrapped around one of the semi-circular ferromagnetic cores 34 and is connected to energizing circuit 50 that is connectable to transmitter 14 via cord 16 whose proximal end is secured in handle 28. The distal end of cord 16 has the phono plug 46 that plugs into transmitter 14. Green LEDs D3 and D4 are mounted in jaw 24 and are illuminated to indicate to the user that power is being applied to winding 52 from transmitter 14, i.e. a power ON condition. Sense winding 62 (FIG. 10) is wrapped around the other semi-circular ferromagnetic core 34 and is connected to sensing circuit 60 that includes green LEDs D1 and D2 that are mounted in jaw 22. The LEDs D1 and D2 are illuminated when sufficient signal is induced in the cores 34 via energizing circuit 50 to induce a signal in sense winding 62 to thereby power LEDs D1 and D2 via sensing circuit 62. This provides a positive indication to the user that jaws 22 and 24 are fully closed.

While an embodiment of an inductive clamp in accordance with the invention has been described and illustrated in detail, modifications and adaptations thereof will occur to persons skilled in the art. For example, the shape and construction of the ferromagnetic cores can be varied. Other forms of indication means can be provided that would include small lamps, LCDs, audible tone generators, vibrators and other devices for providing a readily recognized signal to the user that power is ON and the jaws are fully closed. The closure indicating means need not rely on a coil and signal induced therein, but could include limit switches, Hall effect devices and other known proximity sensors and compatible circuitry. It will be understood that both indicator means are optional and could be mounted in the handles, in the jaws, or remote from the inductive clamp itself. It is not essential to incorporate the illustrated leaf spring assembly, as other forms biasing means may be used including metal torsion springs and coil springs, and well as various resilient plastic flexure members. While the floating pivot point arrangement is advantageous, it is not essential. The jaws and handles could be separate pieces and could be varied in configuration for the most likely application. The cable spool is an advantageous option, along with the tilted hot stick mounting point. As used in the claims hereafter, the term "pivotal connection" is not limited to the floating connection provided by the illustrated leaf spring assembly. Other forms of floating pivotal connection could be used such as a pin in an elongated aperture in which the axis of rotation translates during the opening and closing of the clamp. The term "pivotal connection" also includes conventional forms of pivotal linkage that incorporate pins, axles and other mechanisms that provide for rotation about a fixed axis. The jaws need not be spring biased but could be locked or otherwise fixed in the closed position with clamps, clasps, detents, etc. Accordingly, the protection afforded the invention should only be limited in accordance with the following claims.

What is claimed is:

1. An inductive clamp, comprising:
   a pair of jaws configured to surround a conductor;
   a pair of handles, each connected to a corresponding jaw;
   a pivotal connection that allows the jaws to close around the conductor;
   a ferromagnetic core mounted in each jaw;
   a coil surrounding at least one of the cores; and
   means mounted in at least one of the jaws or handles for indicating to a user that a signal has been applied to at least one of the cores through the coil.

2. The clamp of claim 1 and further comprising means mounted in at least one of the jaws or handles for indicating to a user that the jaws are fully closed.

3. The clamp of claim 1 wherein the pivotal connection provides a floating pivot point that ensures that flat opposing ends of the cores are mated.

4. The clamp of claim 1 and further comprising a leaf spring that biases the jaws to hold them closed around the conductor.

5. The clamp of claim 1 wherein the indicating means includes an LED.

6. The clamp of claim 2 wherein the means for indicating to a user that the jaws are fully closed includes an LED.

7. The clamp of claim 1 and further comprising a cable spool dimensioned and configured to be releasably held between jaws for having an electric cord wrapped around the cable spool.

8. The clamp of claim 1 and further comprising a socket formed in one of the handles and extending at a predetermined angle to facilitate opening the jaws by connection and manipulation of a hot stick.

9. The clamp of claim 1 wherein the cores are laminated.

10. An inductive clamp, comprising:
   a pair of jaws configured to surround a conductor;
   a ferromagnetic core mounted in each jaw;
   a pair of handles, each connected to a corresponding jaw;
   a floating pivotal connection that allows the jaws to close around the conductor and ensures that a pair of flat opposing ends of the cores are mated;
   at least one leaf spring mounted in the handles for biasing the jaws to hold them closed around the conductor; and
   a coil surrounding at least one of the cores.

11. The clamp of claim 10 wherein a stack of leaf springs is mounted in the handles and biases the jaws to hold them closed.

12. The clamp of claim 10 and further comprising a socket formed in one of the handles and extending at a predetermined angle to facilitate opening the jaws by connection and manipulation of a hot stick.

13. An inductive clamp, comprising:
   a pair of jaws configured to surround a conductor;
   a pair of handles, each connected to a corresponding jaw;
   a pivotal connection that allows the jaws to close around the conductor;
   a ferromagnetic core mounted in each jaw;
   a coil surrounding one of the cores; and
   a cable spool dimensioned and configured to be releasably held between jaws for having an electric cord wrapped around the cable spool.

14. The clamp of claim 13 and further comprising means for indicating to a user that a signal has been applied to at least one of the cores.

15. The clamp of claim 13 and further comprising means for indicating to a user that the jaws are fully closed.

16. An inductive clamp, comprising:
   a pair of jaws configured to surround a conductor;
   a pair of handles, each connected to a corresponding jaw;
   a pivotal connection that allows the jaws to close around the conductor;
   a ferromagnetic core mounted in each jaw;
   a coil surrounding one of the cores; and
   means mounted in at least one of the jaws or handles for indicating to a user that the jaws are fully closed.

17. An inductive clamp, comprising:
   a pair of jaws configured to surround a conductor;
   a pair of handles, each connected to a corresponding jaw;
   a pivotal connection that allows the jaws to close around the conductor;
   a ferromagnetic core mounted in each jaw;
   a coil surrounding at least one of the cores; and
   an indicator mounted in at least one of the jaws or handles capable of telling a user that a signal has been applied to at least one of the cores through the coil.

18. An inductive clamp, comprising:
   a pair of jaws configured to surround a conductor;
   a pair of handles, each connected to a corresponding jaw;
   a pivotal connection that allows the jaws to close around the conductor;
   a ferromagnetic core mounted in each jaw;
   a coil surrounding one of the cores; and
   an indicator mounted in at least one of the jaws or handles capable of telling a user that the jaws are fully closed.

* * * * *